UNITED STATES PATENT OFFICE 2,023,511

SUBSTANCE PREPARATION AND ARTICLE OF MANUFACTURE

Edgar E. Brosius, Pittsburgh, Pa.

No Drawing. Application July 13, 1931, Serial No. 550,633

13 Claims. (Cl. 49—77.5)

The present invention relates broadly to the art of material treatment or substance preparation, and more particularly to such an art as applicable to the production of so-called concretes, cements, mortars and the like.

It has heretofore been proposed in the general art to which this invention relates, to utilize blast furnace slag as a filler or aggregate for the general purposes herein contemplated. Such slag is a non-metallic product, consisting essentially of silicates and alumino-silicates of lime developed during the process of making iron in a blast furnace. It is customary to draw off the slag and run it out in thin layers or distributed condition to facilitate cooling. This results in the formation of large slag piles in which the slag has a glassy-like appearance with an appreciable variation in apparent density.

In order to use such slag as an aggregate for concrete, it must be broken up or crushed to the sizes desired. When so crushed it is found that the individual particles while possessing a considerable strength, do not have as high a particle structural strength as desirable in an aggregate for this purpose.

Where granulated slag has been used as a raw material in the manufacture of Portland cement, it is usually suitably proportioned with calcareous and argillaceous matter and the entire mass reduced to the proper fineness for burning in kilns. Portland cement is manufactured either by the dry process or the wet process. In the wet process of manufacture, the material is fed into the kilns in the condition of a slurry. The properties of the granulated slag, and particularly its hydraulic properties, have been such as to cause considerable difficulty in hardening or setting up before the mixture has reached the kiln. Due to this, many manufacturers preferably employ the dry method, in using granulated slag, and feed the material to the kilns in a dry condition.

Not only does slag as heretofore utilized, lack the desired structural strength, and possess sufficient hydraulic properties to render its use objectionable in certain cases, but it contains such a high moisture content as to necessitate effecting a drying operation before it is possible to properly grind the same to any desired degree of fineness. It is one of the objects of the present invention to produce an improved slag in which the moisture content is so low that the drying operation prior to grinding, crushing or pulverizing may be entirely dispensed with, thus saving the delay, expense and labor incident thereto.

It is further known that slag as ordinarily used contains a relatively large amount of sulphur in such form as to be highly injurious to concrete, especially when the slag is used by reducing it to its smaller sizes. The present invention has for another of its objects the treatment of the slag in such manner as to eliminate entirely such a sulphur content.

Such slag also contains an appreciable amount of iron. By treatment in accordance with the present invention, the iron is oxidized into an iron oxide such that its presence in the granulated product is not objectionable.

Still another object of the invention is to produce slag which not only has a greater particle strength from a structural standpoint, but which has a materially lower weight than aggregates heretofore available, and thus produces a concrete of satisfactory strength materially lower in weight than ordinary Portland cement, sand, gravel or similar concrete.

I have further found that ordinary air cooling of slag results in an appreciable reduction in its hydraulic properties. In accordance with the present invention the slag is so treated as to retain its maximum hydraulic qualities.

In carrying out the present invention, I preferably subject slag while in a molten state, to the addition of carefully regulated quantities of water, the quantity of water being so controlled with respect to the temperature and quantity of the slag as to insure substantially complete vaporization of the added water. This may be accomplished in any desired manner, but especially desirable results are obtained if the water addition is made in controlled amounts during a time when the slag is being subjected to violent agitation. While water is preferably utilized, water and steam may be employed, or steam used alone where it is available in sufficient quantities to supply the moisture content required for the purpose, it having been found that under such conditions the slag will react with the moisture to an extent sufficient to produce a material that is hydraulic, particularly in the presence of lime.

By accurately controlling the quantity of moisture added, it is possible to produce a dry or substantially dry product containing a large amount of residual heat. This is easily distinguishable from the results obtained by the ordinary types of slag granulation wherein a considerable amount of moisture remains in the slag in such manner as to cause hydration of all of those particles which are sufficiently fine to be of immediate cementitious value, thus destroying their hydraulic value if the slag is later utilized as an aggregate for concrete. By regulating the water quantity in such manner as to maintain it below a point at which there will be any residual moisture content, the cementitious value of the finer particles is preserved. The moisture content is further important from the standpoint of subsequent handling, it giving a materially greater weight to a given quantity of slag during handling and transporting operations.

I have further found that by effecting an intimate intermixing of a controlled quantity of water with molten slag, there is produced a slag which is not only highly reactive, but one having a highly desirable cellular structure. It is my belief that the gases formed during the granulating process result in an intumescing of the slag particles, thus giving to them a cell-like structure. The residual heat retained in the cellular particles tends to effectively weld or anneal the same together, thus increasing their structural strength to such an extent that the individual particles will retain at least a large percentage of their cells even when molded into concrete units under compressive forces of several thousand pounds to the square inch.

The cellular nature of the slag not only gives a product of light weight, coupled with the desired strength, but one having the property, when used with Portland cement, of taking up the undesirable free lime liberated from the Portland cement during hydration, thus preventing objectionable efflorescence on the surfaces of masonry or concrete. The aggregate itself, which may vary in weight between 25 and 50 lbs. per cubic foot according to the particle size and the resultant voids, gives a Portland cement concrete varying in weight from 70 to 100 lbs. per cubic foot, thus enabling it to be used in many cases where a heavier aggregate would not be satisfactory. It further possesses the desired properties of fireproofing, heat insulation and sound insulation, making it particularly desirable in many special installations.

During the addition of the moisture to the slag for granulation purposes, I also either preferably effect the addition of air, or cause or allow the air to be sucked in in such manner as to intimately contact the slag undergoing granulation, in order to thereby convert a large amount of the sulphide sulphur into sulphate sulphur, or to oxidize the sulphur thus changing it into sulphur dioxide in which form it may be removed as a gas. Some of the sulphur is also converted into hydrogen sulphide where sufficient air is available, and then carried off as a gas.

Slag thus prepared has been found to form an excellent concrete by utilizing mixtures as heretofore proposed, but replacing substantially half of the cement with an equivalent quantity of granulated slag. For masonry cement as high as two-thirds or even more of the Portland cement used in accordance with the usual formulæ may be replaced with pulverized slag produced in accordance with the present invention. The use of such a slag with Portland cement is extremely desirable inasmuch as the slag produced by my invention carries an excess of silica and alumina over that required for its own lime content and thus takes care of the lime released by the Portland cement during continued hydration. When used with Portland cement it has been found that there is a gradual gain in the strength of the concrete as time goes on, due, perhaps, to this inter-action between the excess lime of the Portland cement and the silica and alumina content of the slag. I have likewise found that the interstices left in the mixture due to the evaporation of the excess mixing water are partly filled up due to this action, thus increasing the water repellent properties of articles so formed.

In accordance with the present invention, I may also add to the slag during granulation substances of other types or characteristics depending upon the resulting properties which it is desired to give to the granulated product. These additions may be for the purpose of changing color, changing the weight, increasing the toughness, effecting a coating of the granulated particles, or for any other purpose. If it is desired for example, to decrease the weight of the granulated slag, suitable organic matter such as sugar, dextrine, starch and the like may be added to the water utilized for granulating purposes. If it is desired to change the chemical composition of the slag, such as required for example to change the relationship between the lime, silica and alumina constituents, additional lime may be added in suitable form, such as lime water or lime putty of a suitable consistency.

The above substances being readily soluble in water, are conveniently added in the form of a solution, although the addition may be effected in other ways, as by the direct adding of the constituents in solid form. Other substances that may be added may comprise aluminum compounds capable of producing for example an exothermic reaction in the granulated slag, or substances such as calcium or sodium salts, including calcium chloride, calcium hydroxide, calcium phosphate, calcium sulphate, sodium chloride, sodium silicate or water glass, sodium sulphate or the like. If a tough film on the granulated particles is desirable, this may be accomplished by the addition of pulverized glass, and more particularly pulverized glass suspended in bentonite. This latter combination may be made after the slag is formed, and especially where the water quantity is such that a very appreciable residual heat remains in the slag.

After the slag has cooled and dried, the larger or coarser particles may be sprayed or treated with a bath of suitable solutions of barium hydroxide, strontium hydroxide or calcium hydroxide, these being effective for toughening the particles. If applied to the smaller particles, it has been found that such a treatment has a tendency to destroy some of the hydraulic properties thereof.

Reference has been made to the possibility of replacing up to two-thirds of the Portland cement content as ordinarily provided in masonry cement. Where there is no need for the high strengths of Portland cement and slag, slag when combined with proper materials to increase the plastic qualities, accelerate the hydration and control the setting times, may constitute the entire product. The hydration of slag may be effected by lime in any form, by a small amount of Portland cement and by the calcium sulphate content which in turn may be increased by the addition of gypsum in suitable form. The desired plasticity or long working properties may be obtained by the addition either of lime alone, lime in combination with finely divided plastic clay, bentonite, diatomaceous earths, and other substances such as utilized to increase the plasticity of Portland cement including asphaltic materials, gel producing substances, paraffin, tallow, glue, wax and other oily-like materials. These materials may be added after grinding of the slag, but are conveniently incorporated during the grinding operation to effect a more intimate intermingling thereof. The slag alone does not possess sufficient hydraulic properties to class it as a hydraulic cement, nor is it alone plastic enough to meet the demands of the trade. With additions such as set forth, however, there is obtained a product possessing extremely desirable properties.

It will be apparent to those skilled in the art, that the slag after having been granulated, may be ground or otherwise reduced to the form desired, the more common sizes being those referred to as "rock sizes" corresponding to ordinary commercial gravel, crushed rock or the like incapable of passing through a screen having eight meshes per lineal inch; the "sand size" corresponding to materials which while passing an eight mesh screen will be retained on a screen having 200 meshes per lineal inch; and the "dust size" constituting that portion capable of passing through a 200 mesh screen and useful as a substitute to some extent for Portland cement, or, with proper additions, as masonry cement. It will be understood that these different sizes may be utilized individually with other materials in substantially standard mixes, or that different amounts of the different sizes may be used in the same mix. In each case, where used together the larger sizes will preferably be in excess of the intermediate and smaller sizes, and the medium sizes will be in excess of the smaller sizes, the smaller sizes corresponding approximately for example, to the Portland cement content.

Where a particularly water repellent or water resistant slag is desired, a water repellent substance such as asphalt may be dispersed in a solution to form a colloid by the use of bentonite, for example, and then utilized to treat or coat the particles. Where a water resistant building unit such as a block is desired, an asphaltic or bituminous addition may be made in the form of a finely ground substance capable of being added to the concrete mix, and the entire mix after formation subjected to heat at sufficient temperature to cure the asphaltic or bituminous material.

Due to the cellular characteristics of granulated slag produced in accordance with the present invention, it is particularly useful in the formation of plasters utilized for acoustical purposes, the sand size granulated slag in such case being combined with an appropriate plaster binder.

From the foregoing description, it will be apparent that the present invention possesses the advantages of a slag having a minimum weight, thus facilitating handling thereof due to the almost complete absence of moisture, and facilitating grinding without a previous drying operation. The lack of moisture likewise gives a light weight product, and the method of effecting granulation results in a cellular material of great strength and relatively high hydraulic properties. Such a material is useful for its acoustical properties, its heat insulation properties, its relatively great strength, and inexpensiveness. It may be utilized to a large extent to replace Portland cement in cases where such cement is now employed, and as a general aggregate or filler in concrete and cement articles and products. The peculiar attributes, when combined with cement, make it especially desirable in forming concrete shapes or bodies wherein efflorescence or surface markings are objectionable.

While I have herein described a preferred method of practicing the invention, and of utilizing the material resulting therefrom, it will be apparent that changes in the manner of producing the same, in the subsequent treatment thereof and in the manner of using the same, may be made without departing either from the spirit of my invention or the scope of my broader claims.

I claim:
1. The method of making granulated slag, comprising disintegrating molten slag by subjecting it to violent agitation, and simultaneously adding to the slag an amount of water sufficient to produce a granulated product but so limited as to insure substantially complete vaporization thereof.

2. The method of making granulated slag, comprising disintegrating molten slag by subjecting it to violent agitation, and simultaneously supplying thereto moisture in amount so regulated to the heat and quantity of the slag as to insure substantially complete vaporization of the added moisture.

3. The method of making granulated slag, comprising disintegrating molten slag by subjecting it to violent agitation, and simultaneously adding to the slag water in an amount sufficient to insure granulation but so limited as to be substantially completely vaporized, leaving a granulated product having sufficient residual heat to effect annealing of the granulated slag particles.

4. The method of disintegrating slag, which comprises subjecting molten slag to violent agitation, and simultaneously adding moisture in an amount so limited as to insure substantially complete vaporization to the added moisture.

5. The method of making disintegrated slag, which comprises subjecting molten slag to violent agitation, and simultaneously adding water thereto in an amount sufficient to insure disintegration of the slag but so limited as to be substantially completely evaporated by the heat of the slag.

6. The method of making granulated slag, comprising disintegrating molten slag by subjecting it to violent agitation, and simultaneously adding moisture and supplying air to the slag, the moisture being so regulated as to be substantially completely evaporated from the slag by the heat thereof, and air being supplied in sufficient quantities to oxidize substantially all the sulphur and iron contents of the slag.

7. The method of making disintegrated porous slag, comprising subjecting molten slag to violent agitation, and simultaneously adding water thereto in an amount sufficient to insure disintegration of the slag but so limited as to be substantially evaporated by the heat of the slag, leaving a large amount of residual heat in the slag after treatment, whereby an annealed material having hydraulic properties is produced.

8. The method of making granulated slag, which comprises introducing into the slag sufficient moisture to effect disintegration and granulation thereof but so limited as to be substantially completely vaporized.

9. The method of making granulated slag, which comprises introducing into the slag sufficient moisture to effect disintegration and granulation thereof, as well as producing a hydraulic material, but so limited as to avoid objectionable hydration of the fine particles.

10. The method of making granulated slag, which comprises dividing molten slag into granules by introducing into the molten slag sufficient moisture to effect disintegration and granulation thereof, while limiting the quantity of moisture introduced so as to be substantially completely evaporated during the cooling down of the granules.

11. The method of making granulated slag, which comprises forming molten slag into granules by simultaneously subjecting it to agitation and introducing into the molten slag sufficient moisture to effect disintegration and granulation thereof while limiting the quantity of moisture introduced so as to be substantially completely evaporated by the heat of the molten slag.

12. The method of making granulated slag suitable for aggregate in a cementitious mix consisting in simultaneously dividing molten slag into granules by introducing into the slag sufficient moisture to effect disintegration and granulation thereof but so limited as to be substantially completely vaporized, and oxidizing deleterious ingredients in the slag such as sulphur by bringing air into intimate contact with the disintegrating slag.

13. The method of making granulated slag suitable for aggregate in a cementitious mix consisting in simultaneously introducing into the slag sufficient moisture to effect disintegration and granulation thereof into particles having occluded cells while so limiting the quantity of moisture as to be substantially completely vaporized, and oxidizing sulphur and sulphur compounds in the slag by bringing air into intimate contact with the granulating slag.

EDGAR E. BROSIUS.